United States Patent

Araki et al.

[11] 3,916,618
[45] Nov. 4, 1975

[54] HOLDING DEVICE FOR HOLDING A PROPELLANT GRAIN IN A COMBUSTION CHAMBER

[75] Inventors: Ikuo Araki; Michinori Takizuka; Teruo Kanazawa, all of Aichi, Japan

[73] Assignee: Nihon Yushi Co., Ltd., Tokyo, Japan

[22] Filed: Oct. 7, 1974

[21] Appl. No.: 512,715

[30] Foreign Application Priority Data
Oct. 17, 1973  Japan.............................. 48-115838

[52] U.S. Cl. .................. 60/39.47; 60/255; 102/103
[51] Int. Cl.² ........................................ F02K 9/04
[58] Field of Search.................. 60/253, 255, 39.47; 102/103

[56] References Cited
UNITED STATES PATENTS

| | | | |
|---|---|---|---|
| 3,108,433 | 10/1963 | De Fries et al. .................. | 60/255 |
| 3,173,253 | 3/1965 | Elias .............................. | 60/39.47 X |
| 3,226,928 | 1/1966 | Webb et al. ..................... | 60/255 X |
| 3,397,539 | 8/1968 | Schubert.......................... | 60/255 X |
| 3,724,219 | 4/1973 | Allard et al........................ | 60/255 |

*Primary Examiner*—C. J. Husar
*Assistant Examiner*—Robert E. Garrett
*Attorney, Agent, or Firm*—Woodhams, Blanchard and Flynn

[57] ABSTRACT

A holding device for holding a propellant grain in a combustion chamber, comprising a holder fixed to the top of the combustion chamber by a screw and nut, a supporter-buffer in which the holder is embedded, the supporter-buffer being bonded to the propellant grain through a restrictor, a rear annular ring provided at the rear end of the combustion chamber, and the rear end surface of the propellant grain being adapted to slide in close contact with the surface of the rear annular ring according to the thermal expansion and contraction. Thus, this holding device can make the propellant grain free of thermal strains due to temperature changes and can maintain the propellant grain safe against mechanical stresses due to transportation, storing and firing.

5 Claims, 5 Drawing Figures

HOLDING DEVICE FOR HOLDING A PROPELLANT GRAIN IN A COMBUSTION CHAMBER

BACKGROUND OF THE INVENTION

1. Field of the Invention

This invention relates to a holding device of a solid propellant grain and, more particularly, to a device for securely holding a solid propellant grain, especially, a cylindrical solid propellant grain of end-burning type in a combustion chamber.

2. Description of the Prior Art

For the purpose of securely holding a solid propellant grain in a rocket combustion chamber, the following two methods are well known at present.

In the first method, propellant slurry is cast into a combustion chamber previously provided with anti-combustion agents thereby to form a grain shape, then the grain is hardened by heating and, simultaneously, a part or all of the outside surface of the grain is tightly bonded to a rocket motor case. This method is usually called the direct casting method or casting-bonding method.

In the second method which is called the free-standing method, a propellant grain is supported by molded parts made of anti-combustion agents, metal or incombustible material through buffers such as springs and elastic packings in consideration of thermal and mechanical stresses.

The former method, i.e., the casting-bonding method is suitable for a rocket motor of internal burning type. However, it is not applicable to all the shapes of grain, especially, to a solid grain of end-burning type in which large stresses are created due to temperature changes.

The latter method, i.e., the free-standing method is suitable for a grain of inner surface combustion type or of all-surface combustion type for small-sized rocket motor. However, it is also not applicable to all the shapes of grain. For instance, it is not applicable to a large-sized grain of the end-burning type in which large thermal stresses and strains are created due to temperature changes, because the strength and shock-absorbing capacity of the holding device are limited so that they cannot overcome the above-mentioned stresses and strains and, in addition, because the grain cannot be supported at its rear end since the burning surface is at the end face.

SUMMARY OF THE INVENTION

It is the main object of the present invention to provide a holding device of a cylindrical solid propellant grain of end-burning type which can well withstand thermal stresses and strains created due to temperature changes and, in addition, large mechanical stresses created during transportion and operation.

It is another object of the present invention to provide a holding device of a cylindrical solid propellant grain of end-burning type which can well withstand thermal stresses, mechanical stresses or accelerating forces occurring during operation, etc., and can be safely stored and transported.

It is still another object of the present invention to provide a holding device of a cylindrical solid propellant grain of end-burning type which is suitable for holding double-base, composite, and composite-modified-double-base grains.

The features of the present invention are as follows:

The holding device according to the present invention comprises a front holding mechanism for indirectly fixing the front end of a propellant grain to the top of the combustion chamber when the propellant grain is held in the combustion chamber, and a rear holding mechanism for fixing the propellant grain to the inside of the combustion chamber and absorbing the thermal strain energy created by the thermal expansion-contraction of the propellant grain.

To describe more precisely the front holding mechanism is composed of a holder adapted to be fixed to the front portion of the combustion chamber, a supporter-buffer molded with the above-mentioned holder embedded therein, and a front-end restrictor bonded and fixed to the buffer. In the rear holding mechanism, the rear outside surface of the propellant grain is provided with a tapered portion corresponding to a locus along which the rear outside surface of the propellant grain is moved due to thermal expansion-contraction. (The thermal expansion-coefficient of the propellant grain in the axial direction of the combustion chamber is different from that in the radius direction thereof.) Therefore, a given point on the rear outside surface of the propellant grain is moved along a rectilinear path resultant from the above-mentioned two coefficients and inclined at a certain angle with the axis of the combustion chamber. Thus all such paths are combined into the side surface of a truncated cone, which coincides with the above-mentioned locus, and a rear ring with a tapered surface whose inclination is the same as that of the tapered portion of the rear outside surface of the propellant grain are combined with the propellant grain into one piece with the above-mentioned tapered surface of the rear ring in contact with the rear outside surface of the propellant grain thereby to provide a sliding motion therebetween, or a restrictor fixed to the rear outside surface of the propellant grain and having a tapered portion on the outside surface thereof whose inclination is the same as that mentioned above are combined with the aforementioned rear ring into one piece thereby to provide a sliding motion therebetween during the thermal expansion-contraction.

In the case of the rocket motor of end-burning type, for instance, in the case of a propellant grain for use in missile propulsion, the changes of sizes of the propellant grain in the directions of the axis, circumference and radius of the combustion chamber will be very great if the grain is assumed to be 320 mm in outer diameter and 1,500 mm in length.

In the case of the propellant grain for use in missile propulsion, its ambient temperature is considered to range, for instance, from $-40°$ to $+60°C$ and, therefore, it is required to be stored, handled and fired within the aforementioned temperature range.

The above-mentioned propellant grain changes its length by about 22.5 mm and its outside diameter about 6.4 mm if the temperature changes from $-40°$ to $+60°C$. Accordingly, the difference between the thermal expansion coefficients of the propellant grain and the combustion chamber will create a great thermal stress, if a conventional supporting method is employed. In addition, in such a case, a temperature change from a low temperature to a high temperature or vice versa may result in failure of the propellant grain, combustion chamber, supporters or the like. Thus the conventional supporting method cannot be put into practical use in the case of such a missile.

Under the condition of the above-mentioned propellant grain, a given point on the rear circumferential surface of the propellant grain is moved along a tapered line inclined about 142/1,000 with respect to the axial direction.

Therefore, the rear annular ring and the propellant grain according to the present invention are provided with tapered portions having the same inclination as that mentioned above and are combined together so that the tapered surfaces of the rear annular ring and the propellant grain may come into close contact with each other at room temperature. With such a construction, the displacement of the rear outside surface of the propellant grain resultant from that in the axial direction of the combustion chamber and that in the circumferential direction thereof due to temperature changes is carried out just along the above-mentioned tapered surface. Thus no thermal stress is created in the propellant grain both in the axial and circumferential directions of the combustion chamber and, in addition, the propellant grain can be securely fixed to the center of the combustion chamber.

Moreover, external forces such as those exerted on the rear side of the combustion chamber due to the dead weight or mechanical stresses during transportation, storing or firing can be overcome, since the propellant grain is fixed to the front portion of the combustion chamber through the front holding device. In addition, thermal stresses created in the front end portion of the propellant grain due to temperature changes can be absorbed by the supporter-buffer situated at the front and having a metallic supporter embedded therein.

As is apparent from the foregoing description, the holding device of a propellant grain of end-burning type according to the present invention can perfectly withstand thermal strains or thermal stresses due to temperature changes and also can withstand mechanical stresses created during transportation, storing, firing, etc. Therefore, the failure of propellant grain, combustion chamber, holder, etc., due to the above-mentioned strains and stresses can be prevented from occurring.

The embodiments of the present invention will be hereinafter described in detail with reference to drawings.

DETAILED DESCRIPTION OF THE PREFERRED EMBODIMENTS

Figure 1:
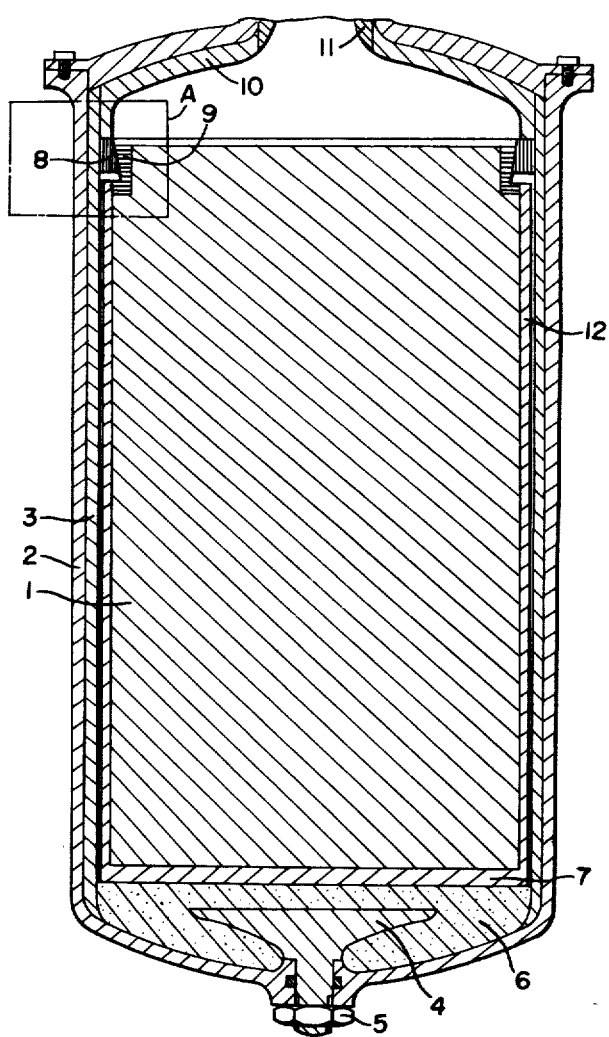
FIG. 1 is a longitudinal sectional view of one embodiment of the holding device of a solid propellant grain according to the present invention.
Figure 2:
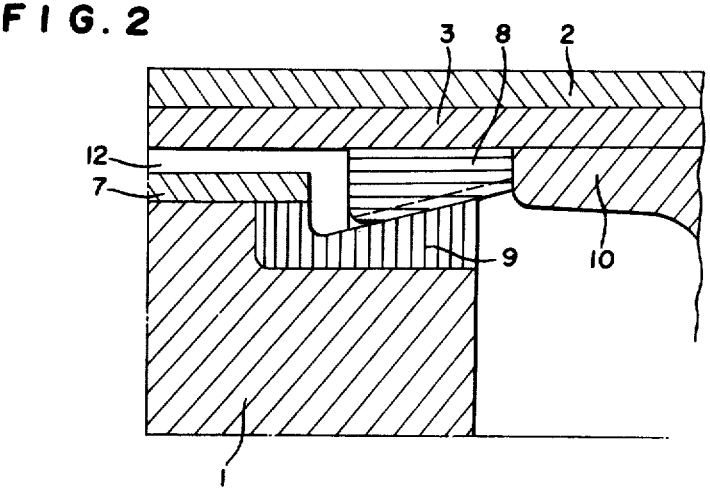
FIG. 2 is an enlarged view of the portion A of FIG. 1 enclosed with a dot-dash line.

Now referring to FIGS. 1 and 2, the numeral 1 designates a propellant grain, 2 a combustion chamber, 3 an insulator, 4 a holder, 5 a nut, and 6 a supporter-buffer.

The propellant grain 1 is produced either by the slurry casting method which casts propellant slurry into a breaker-like cylinder made of rubber-type or cellulose-type restrictive burning agents and then cures it therein, or by a method which forms propellant grain by the extruding process of the casting process, machines the outside surface of the raw grain to obtain a finished grain, and bonds well known rubber-type or cellulose-type anti-combustion agents to the outside surface of the finished grain.

The holder 4 is made of metal or plastics, is fixed to the combustion chamber 2 by means of the nut 5, and is embedded in the support-buffer 6.

The numeral 7 designates a restrictor. A cellulose-type restrictor is usually made of ethyl-cellulose or acetyl-cellulose. In this case, the film-like cellulose material is wound around and bonded to the grain to form a restrictor, or is wound around a mandrel and then is released therefrom to form a rest-beaker, that is, a beaker-like cylinder-type restrictor. These two methods are well known and can be used in the present invention. On the other hand, the rubber-type restrictor is produced by a method which comprises the steps of adding additives such as reinforcing agent, flame retardant, heat resisting agent and vulcanizing agent to commercial rubber such as SBR, NBR, EPDM and chlorosulphonated polyethylene, molding and resulting mixture and vulcanizing thereof. By employing this method, propellant slurry can be cast into a beaker-like restrictor previously molded or a propellant grain whose outside surface has been finished after molding can be bonded to a sheet-shaped rubber and then can be molded therewith.

The supporter-buffer 6 at the front portion of the chamber 2 is made of rubber-type elastomer, and is molded with the holder 4 embedded therein. The holder 4 is used for mechanically fixing the supporter-buffer to the front of the combustion chamber 2 through a nut, etc. The elastomer for use in the supporter-buffer 6 is preferably a rubber material which maintains elasticity in a wide temperature range. For instance, commercial rubber such as natural rubber, SBR, EPDM and silicon rubber is injection-molded into a shape having the holder embedded therein, or liquid rubber such as urethane rubber and silicon rubber is cast into a mold in which the holder 4 is previously set, and is then cured.

The embedded portion of the holder 4 is preferably as small as possible as far as the holder 4 can support the propellant grain, since there is a difference between the thermal expansion coefficients of the metallic holder 4 and the rubber-type buffer 6.

The propellant grain 1 is bonded to the supporter-buffer 6 through the restrictor 7 into one piece, then is inserted into the combustion chamber 2 and is fixed at its front end to the combustion chamber 2 through the nut 5. In another example, several holder holes may be provided on a certain circumference at the front end of the combustion chamber 2, several holders 4 corresponding to the above-mentioned holes are embedded in the supporter-buffer 6, and thus the propellant grain is fixed to the combustion chamber 2 at the front end thereof by nuts 5.

The numeral 8 designates a rear annular ring which is molded so that the rear end of the propellant grain 1 may be moved along its tapered surface when the grain is expanded and contracted.

The numeral 9 designates a rear annular restrictor, and 10 a rear insulator.

The insulators 3 and 10 may be made of rubber-type material mixed with heat resisting agents, reinforcing agents, etc., phenol type FRP reinforced by glass fiber, silica glass, etc., or ceramics, etc.

The rear annular ring 8 may be formed of the same material as the insulator such as rubber-type material, FRP and ceramics, or may be formed of the same material as the restrictor such as cellulose-type and rubber-type materials. However, it is desirable to use the same material as that of the insulators 3 and 10 for use in the combustion chamber 2 in view of the thermal expansion coefficient.

The rear annular ring 8 is preferably split into a few or more parts in order to facilitate the loading operation of the propellant grain into the combustion chamber 2. After loading is completed, the insulators 3 and 10 are bonded to each other at their contact surface by adhesive.

The rear annular restrictor 9 is mounted on the circumference of the rear end of the propellant grain. The outside surface of the rear annular restrictor 9 is tapered so that it may have the same taper as the rear annular ring 8.

The rear annular restrictor 9 is molded from the same material as the restrictor 7 such as ethyl cellulose and acetyl cellulose, or rubber-type material, and is bonded to the rear end of the machined grain 1.

The propellant grain 1 is thus provided with a rear annular ring 8 and the rear annular restrictor 9 which are adapted to be in close contact with each other at room temperature, and is contracted along the above-mentioned taper during temperature drop since its resultant contraction is a combination of its contraction in the axial direction of the combustion chamber 2 and that in the radius direction thereof. Thus the close contact between the annular ring 8 and the rear annular restrictor 9 is maintained.

When the temperature is elevated, the propellant grain 1 is also expanded along the above-mentioned taper since its resultant expansion is a combination of its expansion in the axial direction of the combustion chamber and that in the radius direction thereof.

Accordingly, throughout the entire working temperature range, the tapered surface of the rear annular ring 8 and that of the rear annular restrictor 9 are moved relative to each other while maintaining close contact therebetween. Therefore, no extraordinary stress is applied to the propellant grain 1 and, in addition, a constuction is obtained which can well withstand thermal stresses and mechanical stresses.

Figure 3:
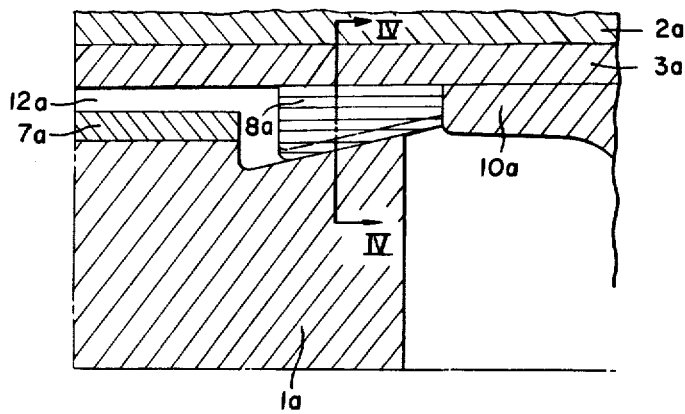
FIG. 3 is an enlarged view of another embodiment of the present invention, showing a portion corresponding to the portion A of FIG. 1.

The numeral 11 designates a nozzle and 12 a clearance. FIG. 3 shows an embodiment according to the present invention similar to the one shown in FIGS. 1 and 2. But, this embodiment has no rear annular restrictor. In FIG. 3, the numeral 1a designates a propellant grain, 2a a combustion chamber, 3a an insulator, 8a an annular ring, 10a a rear insulator, and 12a a clearance.

The insulator 3a, rear insulator 10a and rear annular ring 8a are produced according to the methods similar to those of the embodiment described with reference to FIGS. 1 and 2.

Instead of the rear annular restrictor, the propellant grain is provided at its rear end circumferential surface with a taper corresponding substantially to that of the annular ring 8a. If such a propellant grain 1a is loaded in the combustion chamber 2a, the resultant holding device of propellant grain has just the same effects on thermal stresses and mechanical stresses as the holding device shown in FIGS. 1 and 2.

When this holding device of propellant grain is operated, the machined tapered portion of the propellant grain becomes the burning surface at the initial stage of combustion and, therefore, the internal pressure of the combustion chamber and the thrust are naturally increased proportionally to the increase in burning surface area.

Figure 4:
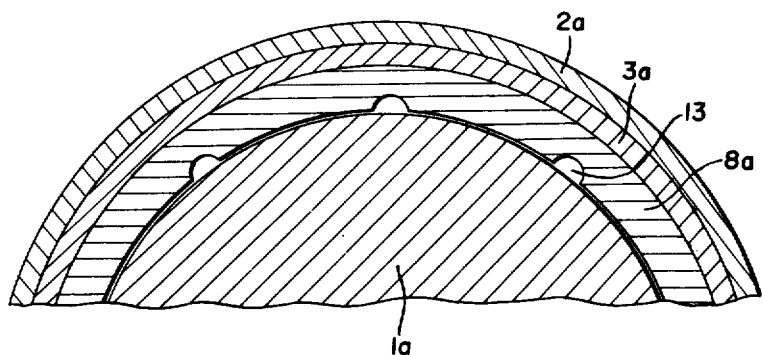
FIG. 4 is a sectional view taken along the IV—IV line of FIG. 3.

Since the tapered portions of the annular ring 8a and the rear annular restrictor 9a or the propellant grain 1a maintain close contact with each other within the entire working temperature range, a plurality of vent notches 13 are preferably provided at the inside of the tapered surface of the annular ring 8a so that combustion gases may sufficiently circulate through the clearance between the insulator and the side restrictor at the initial stage of combustion, as shown in FIG. 4.

Figure 5:
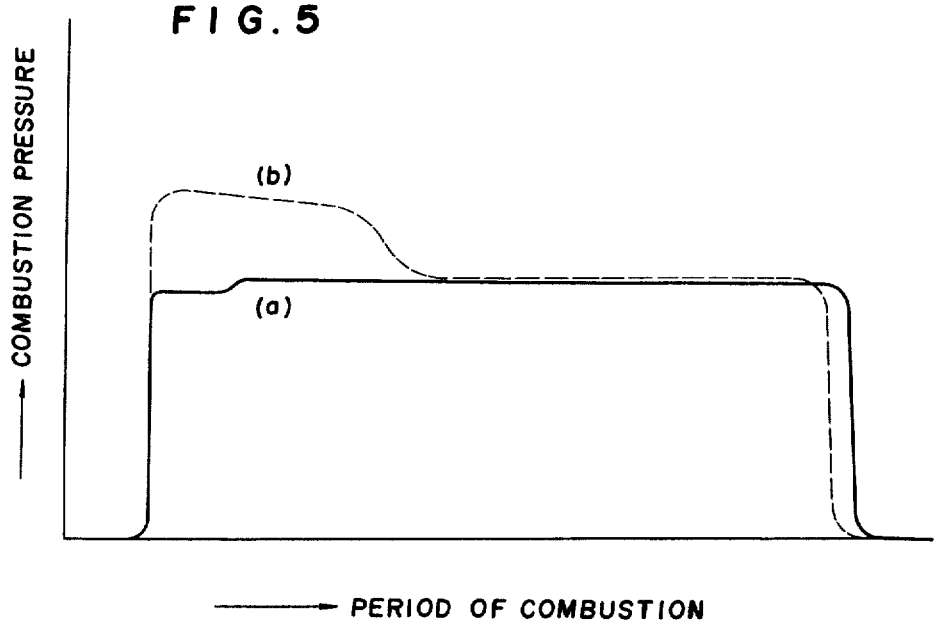
FIG. 5 is a diagram showing the relationship between combustion chamber pressure and combustion time of the respective embodiments shown in FIG. 2 and FIG.

The burning surface of the propellant grain shaped as shown in FIG. 3 is greater than that shown in FIG. 2 and, therefore, the respective propellant grains differ from each other in the relationship between the combustion chamber pressure and the burning time as shown in FIG. 5.

In FIG. 5, the curve (a) is the pressure-time history of the propellant grain shown in FIG. 2 and the curve (b) is that of the propellant grain shown in FIG. 3.

In the curve (a), the pressure is substantially constant, though it shows a slight decrease in the initial stage of combustion. On the other hand, in the case of the curve (b), the pressure is increased in the first combustion period throughout a considerable time and, in addition, the total burning time is slightly decreased.

The increase of the combustion chamber pressure and the thrust in the first period of combustion in case of the curve (b) has the function of a booster propellant and is very useful for missiles and other flying objects depending upon the purposes thereof.

Therefore, it is determined by the design performance of a flying object to be produced which of the constructions shown in FIG. 2 and FIG. 3 should be selected.

The lengths of the tapered portions of the annular ring, rear annular restrictor and the propellant grain are determined so that their overlapped portions may at least withstand external forces.

It is desirable to design the construction so that the end of the annular ring 8 may substantially not come into contact with the end of the rear annular restrictor or the propellant grain even at the maximum temperature. The length of the tapered portion is preferably greater than about 30 mm when the length and outside diameter of the propellant grain are 1,500 mm and 320 mm, respectively.

The embodiments of the invention in which an exclusive property or privilege is claimed are defined a follows:

1. A holding device for holding a solid propellant in a combustion chamber, comprising a holder fixed to the front end of said combustion chamber, a supporter-buffer mounted in the front end portion of said combustion chamber, said holder being embedded in said supporter-buffer, a restrictor coated on said propellant grain and bonded to said supporter-buffer, an isulator surrounding said restrictor-coated propellant grain with a clearance therebetween, a tapered portion provided at the rear end of said propellant grain having the same inclination as that of the locus along which said propellant grain is moved due to the thermal expansion and contraction thereof, a rear annular ring fixed to said insulator and provided with a tapered surface having the same inclination as that of said tapered portion, and the surface of said tapered portion at the rear end of said propellant grain being adapted to come into contact with said tapered surface of said insulator within the working temperature range.

2. A holding device as set forth in claim 1, wherein said tapered portion is provided on the outside surface of the rear end portion of said propellant grain.

3. A holding device as set forth in claim 1, wherein said tapered portion is provided on a rear annular restrictor fixed to the rear end of said propellant grain.

4. A holding device as set forth in claim 1, wherein said holder has a screw portion at the front end thereof, said combustion chamber is provided at its front end with a screw hole into which said holder is screwed, and said combustion chamber and said holder are tightened together by a nut.

5. A holding device as set forth in claim 1, wherein said rear annular ring is provided on its internal surface with a plurality of vent notches.

\* \* \* \* \*